United States Patent [19]

Gibbons et al.

[11] Patent Number: 5,122,791
[45] Date of Patent: Jun. 16, 1992

[54] DISPLAY DEVICE INCORPORATING BRIGHTNESS CONTROL AND A METHOD OF OPERATING SUCH A DISPLAY

[75] Inventors: David J. Gibbons, Uxbridge; Andrew T. Rowley, Anstey Heights; Bernard J. Green, Harrow, all of England; Ian M. Green, Buckie, Scotland

[73] Assignee: Thorn EMI plc, London, England

[21] Appl. No.: 99,376

[22] Filed: Sep. 21, 1987

[30] Foreign Application Priority Data

Sep. 20, 1986 [GB] United Kingdom ............... 8622711
Jul. 9, 1987 [GB] United Kingdom ............... 8716162

[51] Int. Cl.$^5$ .............................................. G09G 3/36
[52] U.S. Cl. .................................... 340/784; 340/701; 340/703; 340/793; 359/48
[58] Field of Search ..................... 350/345, 332, 333; 340/701, 703, 793, 765, 784, 752, 766, 783, 795; 358/241; 359/48

[56] References Cited

U.S. PATENT DOCUMENTS

| | | |
|---|---|---|
| 3,590,156 | 6/1971 | Easton . |
| 3,845,243 | 10/1974 | Schmersal . |
| 4,006,298 | 2/1977 | Fowler et al. . |
| 4,090,219 | 5/1978 | Ernstoff et al. . |
| 4,210,934 | 7/1980 | Kutaragi ........................ 358/241 |
| 4,368,826 | 6/1983 | Stolov ............................ 350/345 |
| 4,378,568 | 3/1983 | Mir . |
| 4,380,023 | 4/1983 | Mir et al. . |
| 4,559,535 | 12/1985 | Watkins et al. . |
| 4,720,706 | 1/1988 | Stine ............................... 340/766 |
| 4,725,828 | 2/1988 | Cowlishaw ................... 340/701 |
| 4,752,771 | 6/1988 | Katogi et al. ................. 340/793 |

FOREIGN PATENT DOCUMENTS

| | | |
|---|---|---|
| 0151508 | 8/1985 | European Pat. Off. . |
| 0174497 | 3/1986 | European Pat. Off. . |
| 0193728 | 9/1986 | European Pat. Off. . |
| 60-89042 | 9/1985 | Japan . |
| 60-163023 | 1/1986 | Japan . |
| 60-260922 | 5/1986 | Japan . |
| 1390925 | 4/1975 | United Kingdom . |
| 2164776A | 3/1986 | United Kingdom . |
| 2172733 | 9/1986 | United Kingdom . |

*Primary Examiner*—Alvin E. Oberley
*Assistant Examiner*—Richard Hjerpe
*Attorney, Agent, or Firm*—Fleit, Jacobson, Cohn, Price, Holman & Stern

[57] ABSTRACT

A display device is formed by a matrix of surface-stabilized bi-stable ferroelectric liquid crystal elements each being separately settable by a matrix driver. To provide brightness control or color in the display, all the elements of the matrix are set in accordance with a portion of a signal for display and the amount of light passing through the matrix for that setting is controlled in accordance with the binary significance of the respective portion of the signal. This control is produced by varying one of the activation duration or intensity of a light source, such as sets of fluorescent tubes in accordance with the binary significance of the brightness information in the input signal. Half of the frame time (T) is used for the numerous setting operations on the matrix of elements and half is used for the backlighting operations of the various settings.

10 Claims, 6 Drawing Sheets

DISPLAY DEVICE INCORPORATING BRIGHTNESS CONTROL AND A METHOD OF OPERATING SUCH A DISPLAY

The present invention relates to a display device incorporating liquid crystal display elements.

British Patent Specification No. 2172733A discloses a display formed of a matrix of liquid crystal devices backlit by three light sources which are switched on sequentially each for a time duration corresponding to a third of the frame period. The intensity is controlled by using the liquid crystal elements in the variable transmission mode.

The present invention provides a display device comprising a lattice of liquid crystal display elements, each element selectively settable between two states, one state allowing the transmission of light therethrough and the other state not allowing the transmission of light therethrough, means to effect setting of the lattice in accordance with a portion of a signal for display, and means to control the light output by the display device for a given setting of the lattice, said control means including means to render the amount of light passing through the lattice for a given setting proportional to the binary significance of that portion of the input signal.

Preferably, the light passage means comprises means to operate, for a given setting, a light source at a light intensity proportional to the binary significance of the portion of the signal for display at that given setting.

Advantageously, in a colour display, the light-passage means comprises means to operate three light sources of different colour characteristics, such that the intensity of each light source is proportional to the binary significance of that portion of the signal for that setting.

The maximum intensity for the three light sources need not be the same; for example, if the three light sources are such that one emits green light, another blue light and the third red light, then the green-emitting source may have a higher maximum intensity than the red or the blue sources.

Additionally or alternatively the light-passage means comprises means to generate a light source for a time duration proportional to the binary significance of the brightness portion of the input signal for that pixel. For a colour display, preferably the light-passage means comprises means to operate three light sources of different colour characteristics, such that the intensity of each light source is proportional to the binary significance of that colour brightness for that pixel in the input signal to the device. The maximum time duration for the three light sources need not be the same.

Preferably, the signal for one picture comprises a sequence of words (for example each of 8 bits), each one corresponding to the display information for a display element in the lattice. Thus the output means can operate such as to take out, from the store, the first bit in each word and pass them sequentially to the lattice; thereafter the output means can operate such as to take out, from the store, the second bit in each word and pass them sequentially to the lattice. This operation can be repeated until all the bits have been processed in this way.

As the bits in a given position (e.g. first) in the display word reach the drivers, they set each pixel to the corresponding condition. Once the entire lattice has been set in accordance with a given bit-position, the light-modulation means can be activated to output light in accordance with the given bit-position; thus, for example, if the given bit-position is the first bit in the word and this is designated as the most-significant bit, then the light output with the elements in this condition is accordingly a substantial fraction of the total output. The light output for the most-significant-bit setting may be double that for the secondmost-significant-bit setting, which is itself double that for the third most-significant-bit setting, and so on. The light modulation means may have means to regulate the intensity of the light output in accordance with the given bit-position, and/or means to regulate the duration of light output in accordance with the given bit-position.

Preferably the display device may have means to blank the elements during setting of the elements for a given bit position.

For a colour display, preferably the display device has a lattice formed of groups of three display elements, each of the elements in a group producing a different colour and being set separately. In an alternative arrangement, the lattice is formed of single display elements, each of which is exposed to light of the three colours sequentially, an element being re-set after each exposure.

The present invention also provides a method of operating a grey-scale display device having a lattice of bi-stable display elements, the method comprising:

inputting a signal, representing the display information for one picture, to a store;

outputting from the store a section of the display information for one picture, the section consisting of corresponding portions of display information for all the bi-stable display elements;

using a plurality of drivers, each allocated to a row or column of the lattice, to effect setting of each display element to a condition in accordance with its respective portion of the signal from the output means;

producing a light output, once the elements are set, modulated in accordance with the significance of the portion of the video signal;

outputting from the store a second section of the display information, the second section consisting of different corresponding portions of display information for all the bi-stable display elements, and effecting the setting and modulating operations for the second section; and repeating the outputting, setting and modulating operations on any further corresponding portions.

Preferably, the signal comprises an 8-bit word for each element, and the most-significant-bit of each word is first output from the store for setting and display. Thereafter the second-most-significant-bit of each word is output from the store for setting and display, the total light output being half the previous output. This sequence is repeated until the least-significant bit has been displayed.

Preferably, modulation of the light output is achieved by regulation of the light intensity and/or of the duration of light output.

Preferably, each row and column of the lattice has a separate driver. Alternatively, each column has a separate driver, and some or all the rows have a common driver.

Preferably a display element comprises one or more selectively-settable liquid crystal cells.

The present invention is applicable to many forms of displays, for example to one in which the image is presented at a surface of a liquid crystal panel backlit by fluorescent tubes, or to one in which the image is projected onto a screen by means of a liquid crystal panel positioned in the path of a light beam. Also, the present invention is applicable to colour displays and to black-and-white displays.

Furthermore, the present invention also embodies equipment for the generation, and/or transmission, and/or reception, and/or processing, of signals suited and/or designed for a display device as herein defined.

Additionally or alternatively the light-passage means comprises means to generate a light source for a time duration proportional to the binary significance of the brightness portion of the input signal for that pixel. For a colour display, preferably the light-passage means comprises means to operate three light sources of different colour characteristics, such that the intensity of each light source is proportional to the binary significance of that colour brightness for that pixel in the input signal to the device. The maximum time duration for the three light sources need not be the same.

In order that the invention may more readily be understood, a description is now given, by way of example only, reference being made to the accompanying drawings in which.

Figure 1:
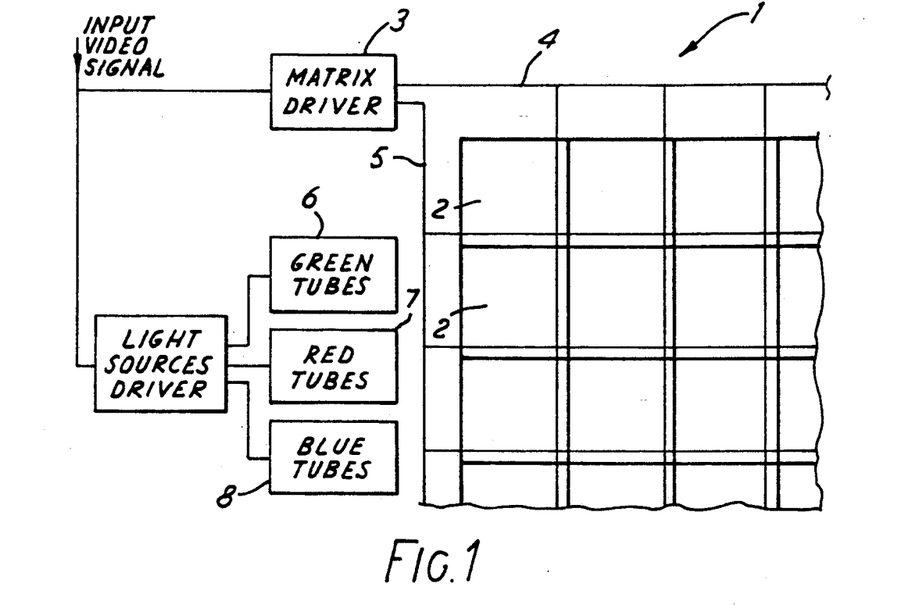
FIG. 1 is a block schematic diagram of part of a display device embodying the present invention.

There is shown in FIG. 1 part of a colour-sequential display 1 formed by a matrix of surface-stabilised bi-stable ferroelectric liquid crystal elements 2. Each element 2 is separately settable, by the output of appropriate signals from matrix driver 3 along column conductor lines 4 and row conductor lines 5, between two states, in one of which light can pass through the element and in the other of which light is prevented from passing therethrough.

Display 1 has three sets (6, 7 and 8) of fluorescent tubes, each set providing uniform backlighting of the matrix in a respective colour (green, red, and blue) used to produce a colour display.

In order to avoid any problems of top-bottom shading, all the elements 2 forming the matrix are set to their relevant state (i.e. light-transmitting or light-blocking) in each field before a set of fluorescent tubes is activated.

In order to provide brightness control of the display, the activation duration of the sets of fluorescent tubes is variable, being dependent on the binary significance of the brightness information for the relevant colour in the input signal. Half of the frame time (T) is used for the numerous setting operations on the matrix of elements and half is used for the backlighting operations of the various settings. The setting and backlighting operations in respect of the green light constitute half the frame time, while those for each of the red and blue light constitute quarter the frame time. This display utilises an eight bit-encoded video signal consisting of four bits dedicated to the green light information, and two bits dedicated to each of the red and blue light information.

More specifically, in order to display the green light information in one frame, there is a sequence of four consecutive writing operations each separated by a green backlighting pulse of predetermined duration and amplitude. The writing of a stable bi-level pattern is achieved, while all the lights are off, by addressing the matrix via lines 4 and 5 according to the significance of the respective bit in the input video signal. For example, a bi-level pattern corresponding to the most-significant-bit is written over the entire matrix and, once completed, tube set 6 is turned on with an intensity $8I_g$ for a time period $T/16$, where $I_g$ is a reference light intensity for the green image. Tube set 6 is then turned off for $T/16$, during which the matrix is overwritten to form a pattern appropriate to the next most-significant-bit, this taking $T/16$: once completed, tube set 6 is turned on at an intensity $4I_g$ for $T/16$. Then the light is pulsed off again for $T/16$, and the matrix is overwritten to produce a pattern corresponding to the next most-significant-bits for the green image, after which tube set 6 is turned on for $T/16$ at intensity $2I_g$. The overwriting and exposure sequence is repeated again, for a lighting intensity of $I_g$, whereupon display of the green image is completed.

Figure 2:
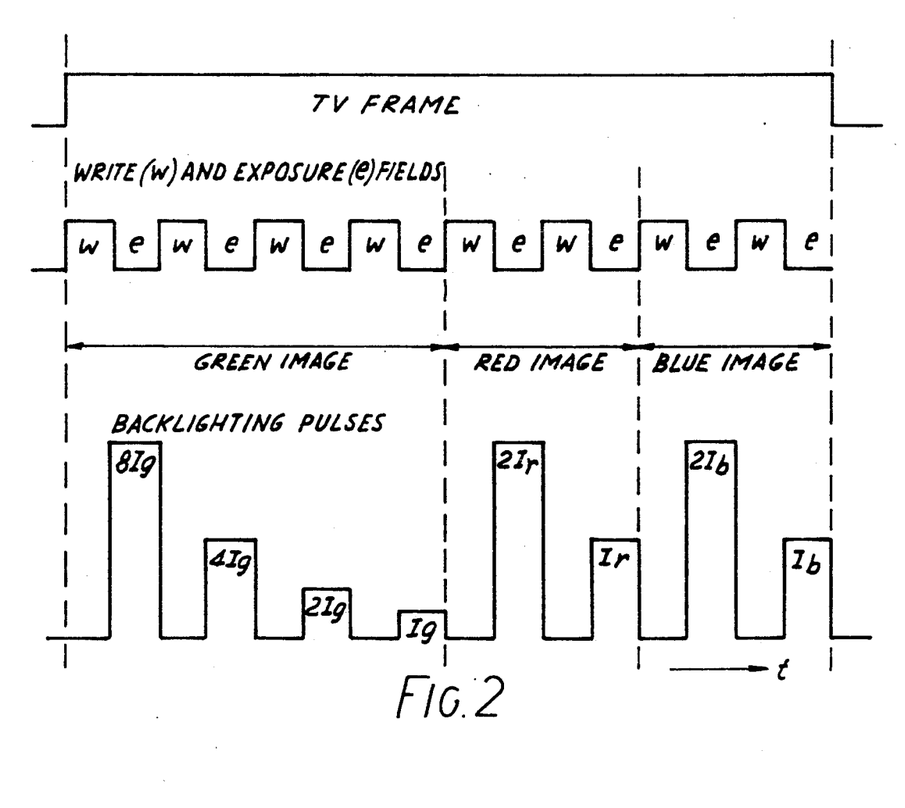
FIG. 2 is a diagram of waveforms for use in a display device embodying the present invention.

To achieve display of the red image, a similar routine is followed but this time only two patterns are overwritten and exposed, the first pattern at an intensity of $2I_r$ and the second at an intensity of $I_r$. Each pattern is written in a time period of $T/16$, with tube set 7 off. For the blue image, this routine of only two patterns is repeated, at intensities $2I_b$ and $I_b$. FIG. 2 shows the relevant waveforms used to produce a display with these routines.

Figure 3:
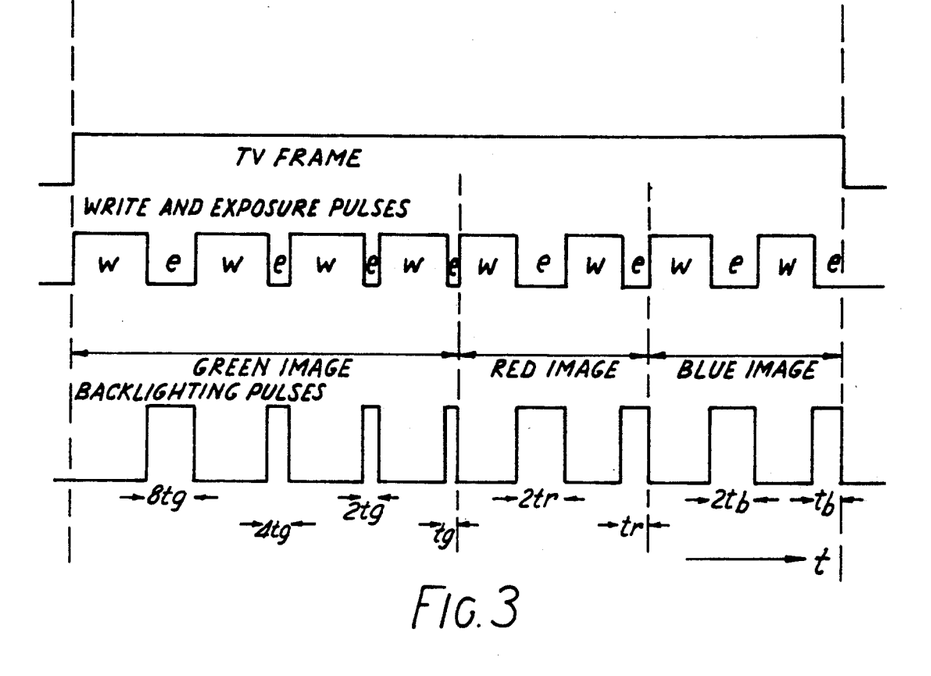
FIG. 3 is a diagram of waveforms for use in another embodiment of display device.

In an alternative form, the duration of exposure of the various patterns differs, while the intensity of the light sources remains the same for all the patterns overwritten. Thus, to display the green light information, there are four overwriting/exposure operations each having a common writing duration, but having differing exposure durations of $8t_g$, $4t_g$, $2t_g$ and $t_g$. Likewise each of the routines for producing the red and blue displays has two overwriting/exposure operations having differing exposure durations of $2t_r$ and $t_r$, or $2t_b$ and $t_b$ respectively. FIG. 3 shows the relevant waveforms used to produce a display with these routines.

Figure 4:
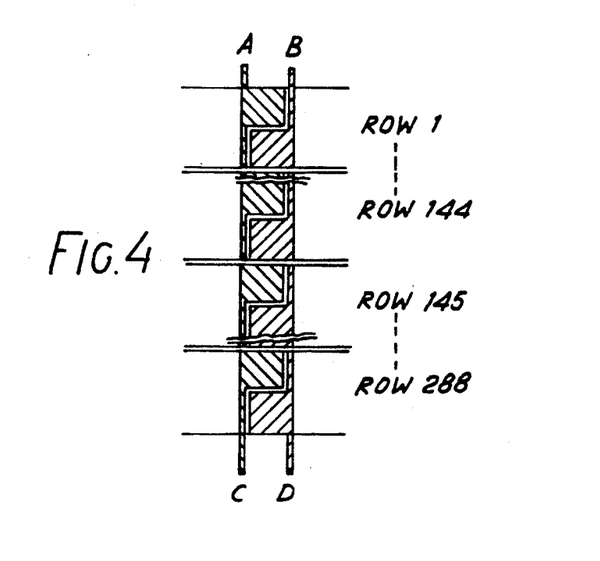
FIG. 4 diagram of a part of a further embodiment of the present invention.

As the display 1 conforms to the PAL system standards, each frame must consist of 575 active lines per 40 ms which must be displayed every 20 ms to ensure a flicker-free image. In each 20 ms period, eight fields corresponding to each grey level and colour need to be written, so that the total writing time is 4.3N ms per line, where N is the number of subdivisions of the display area that can be addressed in parallel. Such parallel addressing can be achieved in a number of ways, one of which is to utilise the arrangement of light gates and conductors as shown in FIG. 4, whereby each column is made up of four sub-electrodes A, B, C and D. In this way, by doubling the number of light gates per line conductor and doubling the number of column conductors, it is possible to switch four lines simultaneously. Thus, by addressing 144 lines sequentially downwards from the top while simultaneously addressing 144 lines sequentially upwards from the bottom, a total of 576 lines are addressed in the time taken to scan 144 lines. In this instance, N=4 and so, if all the fields are to be written in 20 ms, the time available for writing is 17 ms per line.

In a modification, both the duration of exposure and the intensity of the light sources can be made to be variable.

The three sets 6, 7, 8 of fluorescent tubes are contained in a housing designed to provide a uniform flux of each colour into the display. The sets of tubes used in the backlight are low pressure mercury/rare gas (LPMV) discharge lamps coated on the inside wall with a phosphor, chosen to have appropriate spectral distribution, rise and decay time characteristics. The lamps are run off a high frequency supply (>10 kHz) which is switched sequentially between the three lamps using non-rectifying thyristor switching elements. The on-time of the lamp may be made variable, consistent with the transmissive mode window of the display to provide colour balance and overall brightness adjustment.

Figure 5:
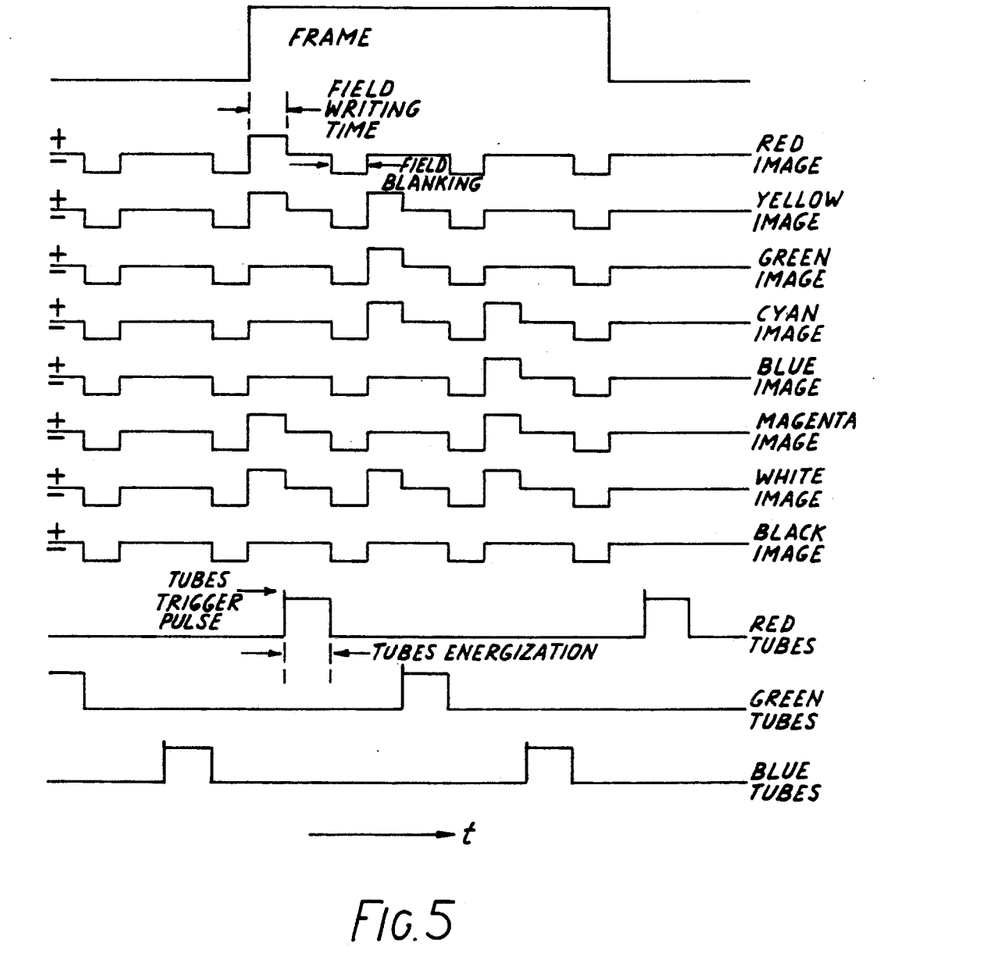
FIG. 5 is a diagram of the sequence of waveforms in one frame for a display device embodying the present invention.

FIG. 5 shows a sequence of addressing signals appropriate to produce an 8-colour display suitable for most alphagraphics and capable of three times the resolution of a microdot colour display, since it requires only one cell per picture element. With a suitable liquid crystal display device it would be possible to arrange for temporal and/or spatial modulation of each gate to provide halftoning.

The use of a bi-stable ferroelectric liquid crystal display in the manner described above enables the possibility of providing for each pixel, six colours together with black and white.

The colour-sequential technique of addressing mentioned above requires the tubes to run at frequencies greater than about 65 Hz in order to provide flicker-free displays. There is about 5 ms available for each frame of information on an individual colour, during which period the information has to be written on the display and illuminated. Such time restraints require the phosphor to be used to have specific characteristics including a narrow band emission at an appropriate wavelength and a decay time (i.e. time to fall to 10% of maximum or operational output) of less than 1 ms. Cheap wide band (light transmission) filters are used to filter out the mercury spectral lines from the light output.

Resistive ballasts are used if square light pulses are required to illuminate the display, and also because they do not introduce any delays into the circuit. By making part of the ballast resistance variable, the overall screen brightness and colour can be simply adjusted. The pulse shape of the light output can be altered by appropriate choice of ballast components, for example, using reactive components. The possibility of shaping the light output pulses allows the lines of display to be switched whilst the lamps are on.

The sequence of illuminating the sets of tubes can be important to the overall performance, and image-quality, of the display. Thus for example the illumination sequence of red light sources, then green light sources, then blue light sources can substantially affect the colour performance as compared to the sequence of red, then blue, then green sources.

The colour of the 6 available colours of the display can be altered by changing the phase of the lamp pulse with respect to the LCD drivers. In effect, this moves a window across the light output.

The colour of each individual pixel can be adjusted to give more than the 6 colours previously mentioned by a similar technique to that used to give control of the brightness of each individual pixel (greyscale).

Figure 6:
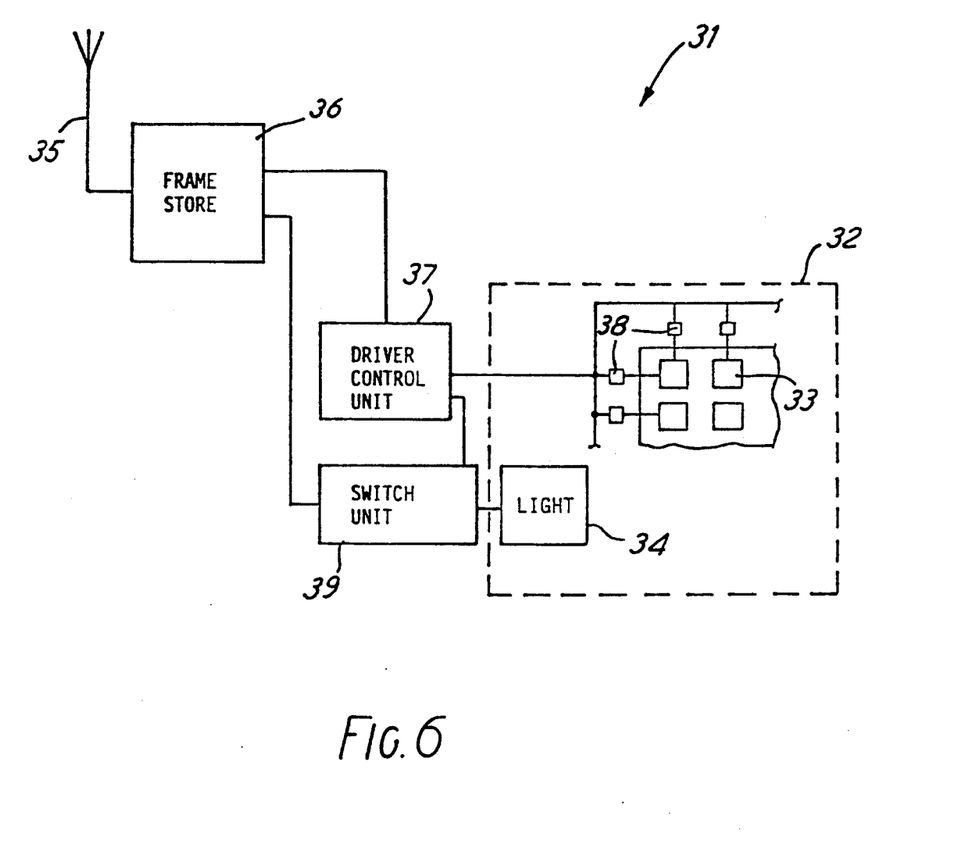
FIG. 6 is a block diagram of a display device embodying the present invention.

The television receiver 31 of FIG. 6 has a liquid crystal display 32 formed of a lattice of display elements 33 made from liquid crystal material, each element being individually actuable. The lattice of elements 33 is backlit by a number of fluorescent tubes 34 whose light intensity and duration of operation can be controlled.

The video signal for input to television receiver has a 70 Hz scan rate providing a scan period of 14 ms, and includes in each picture of display information an 8-bit word for each display element, a word beginning with the most-significant-bit and ending with the least-significant-bit. When this signal is input to receiver 31 via its aerial 35, one picture of display information passes to a frame store 36.

In the processing for the display of the most-significant-bits of the word, frame store 36 outputs the first bit of each word and sends the bits to a control unit 37 for an array of drivers 38, one being assigned to each row and column of the lattice. The driver array sets each element to the condition (on or off) appropriate to its most-significant-bit. Once the array of drivers 38 has set all the elements (which takes less than 1 ms), driver control unit 37 instructs light switch unit 39 which checks the relevant bit-position (in this case the most-significant-bit) and then activates the fluorescent tubes 34 for a time duration of 3 ms and at an intensity to provide an appropriate output.

When the required output has been achieved then the light switch unit 39 de-activates the tubes 34 and instructs frame store 36 which proceeds to output the secondmost-significant bits to driver control unit 37 thereby to set all the elements for this bit-position. On this occasion, light switch unit 39 activates the tubes half as long as before (namely 1.5 ms) at the same intensity to provide only half the output as that for the most-significant bits. This routine is repeated for all eight bits of the words, the light output being halved each time. Once the least significant bit has been displayed (the light output time duration being 25 ms), the store 36 is emptied and the next picture of display information is input and the processing described above is repeated.

Figure 7:
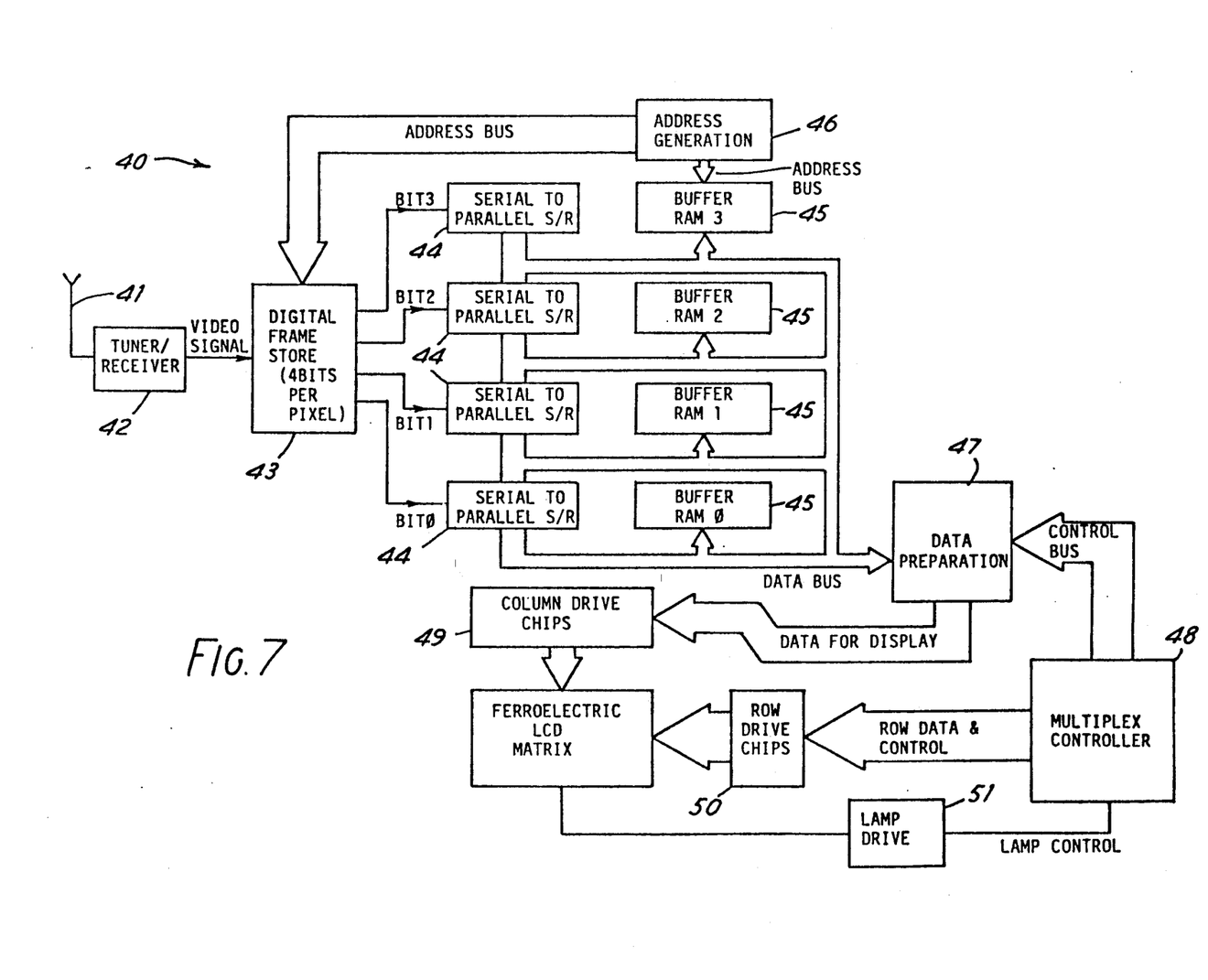
FIG. 7 is another block diagram of a display device embodying the present invention.

FIG. 7 is a block diagram of a system 40 for displaying off-air video pictures on a bistable display, such as a ferroelectric liquid crystal display panel. Video information is received at aerial 41 and demodulated by the receiver 42; it is then digitized (four bits per pixel) and held in the digital frame store 43.

To display one video frame, firstly the data is split into four streams (one for each bit) and compressed by shift registers 44 so each byte contains data for 8 pixels. The data is then loaded into four buffer RAMs 45, so each RAM now contains one j frame of video information 1 bit deep. Accessing of the RAMs 45 and the frame store is done under control of the address generator 46.

For the sequential greyscale processing the data must be sent to the display one bit at a time, i.e. firstly all the data from RAM 0 is sent to the display (the least significant bit), then followed in turn by each of the other 3 RAMs. Also, in order to write data to the light crystal display panel each line of data must be presented in a manner determined by the multiplexing scheme; this processing is performed by the data preparation block 47. Data is now in a form in which it can be sent to the display panel under control of the multiplex controller block 48, each line of data being latched into the column drive chips 49 while rows are strobed by the row drive chips 50. This results in the data being latched into the display. After a full screen of data has been written, the backlight is flashed for a length of time corresponding to the significance of the bit being displayed. This is done by the lamp drive circuit 51 under control of the multiplex controller 48.

The sequence of events which results in a full picture with sixteen grey levels being displayed, is as follows:
1. Load frame store 43;
2. Load buffer RAMs 45, one significant bit to each;
3. Load data from buffer RAM 0 line by line into data preparation unit 47;
4. Load data from buffer RAM 1 line by line into data preparation unit 47;
5. Load data from buffer RAM 2 line by line into data preparation unit 47;
6. Load data from buffer RAM 3 line by line into data preparation unit 47;
7. Multiplex controller 48 sends data from data preparation unit 47 to column drive chips 49 and controls row drive chips 50;
8. When data from RAM 0 has been latched into the display (i.e. when the least significant bit for the frame is being presented), the multiplex controller 49 signals the lamp drive to flash for a period of time A mS;
9. Data from RAM 1 is now latched and the backlight flashed for 2A mS;
10. Data from RAM 2 is now latched and the backlight flashed for 4A mS;
11. Data from RAM 3 is now latched and the backlight flashed for 8A mS;
12. The picture has now been displayed.

Assuming a frame time of 40 mS, then if it takes T mS to set up the display $4T+15A=40$ mS.

Figure 8:
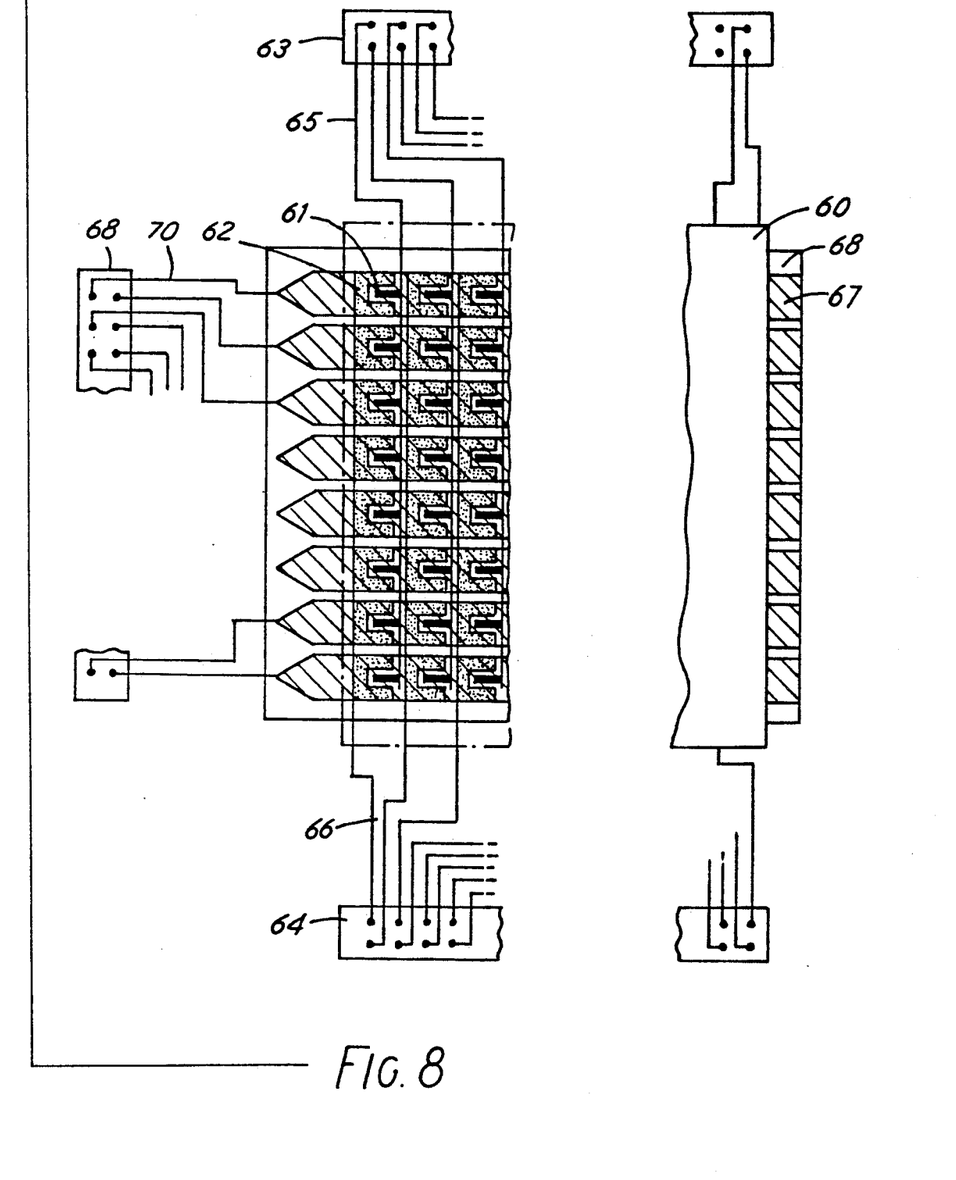
FIG. 8 shows a pixel arrangement for a display device embodying the present invention.

FIG. 8 shows an arrangement of metallisation patterns for a liquid crystal display panel to achieve a two-bit greyscale, for use additionally or alternatively to the greyscale processing of FIGS. 6 and 7. On the substrate 30 having the column electrodes, the ITO metallisation patterns are such that each pixel has two sections 61, 62 which can be separately driven from appropriate drive chips (not shown) on flexible pcb boards 63 and 64 via lines 65 and 66 respectively. For each pixel, section 61 corresponds to the least-significant-bit, and section 62 to the most-significant-bit. The row electrodes are formed by ITO metallisation strips 67 on substrate 68, which can be strobed by row drive chips (not shown) on flexible pcb 69 via lines 70. In FIG. 8, on the left hand side the substrate has been omitted as indicated by the broken-chain line yet the column metallisation is shown overlying the row metallisation, for the purpose of simplicity.

We claim:
1. A liquid crystal display device comprising:
a lattice of liquid crystal display elements, each element selectively settable between two states, one state allowing the passage of light therethrough and the other state inhibiting the passage of light therethrough;
data input means arranged for supplying data to the lattice;
lattice setting means for setting all the elements in the lattice into either of the two states in dependence upon a significance-weighted portion of the supplied data;
lighting means for lighting the lattice subsequent to the setting of all the elements therein;
and control means for controlling the amount of light passing through the lattice for said setting in accordance with the binary significance of said portion of the supplied data.

2. A display device according to claim 1 wherein the control means is arranged for controlling the lighting means at a light intensity in accordance with the binary significance of said portion of the supplied data.

3. A display device according to claim 1, wherein in a colour display, the control means is further arranged for controlling the lighting means, which lighting means comprises three light sources of different colour characteristics, at an intensity in accordance with the binary significance of said portion of the supplied data.

4. A display device according to claim 3 wherein the minimum intensity for the three light sources is not the same.

5. A display device according to claim 1 wherein the control means is further arranged for controlling the lighting means such that the light output therefrom is of duration in accordance with the binary significance of said portion of the supplied data.

6. A display device according to claim 1 wherein, in a colour display, the control means is further arranged for controlling the lighting means, which lighting means comprises three light sources of different colour characteristics, such that the time duration for which a light output is produced at said lattice setting is in accordance with the binary significance of said portion of the supplied data.

7. A display device according to claim 6 wherein the minimum time duration for the three light sources is t the same.

8. A method of operating a liquid crystal display device comprising a lattice of liquid crystal display elements, each element selectively settable between two states, one state allowing the passage of light therethrough and the other state inhibiting the passage of light therethrough, the method comprising:
supplying data to the lattice;
setting all the elements in the lattice into either of the two states in dependence upon significance-weighted portion of the supplied data;
lighting the lattice subsequent to the setting of all the elements therein;
and controlling the amount of light passing through the lattice for said setting in accordance with the binary significance of said portion of the supplied data.

9. A method according to claim 8 wherein the controlling is further arranged to control the lighting at an intensity in accordance with the binary significance of said portion of the supplied data.

10. A method according to claim 8 wherein the controlling is further arranged to control the lighting such that the light output therefrom is of duration in accordance with the binary significance of said portion of the supplied data.

* * * * *